United States Patent Office 3,781,225
Patented Dec. 25, 1973

3,781,225
TREATMENT OF COLLOIDAL ZEOLITES
Albert B. Schwartz, Philadelphia, Pa., assignor to Mobil Oil Corporation, New York, N.Y.
No Drawing. Continuation-in-part of abandoned application Ser. No. 842,014, July 15, 1969. This application Apr. 17, 1972, Ser. No. 244,907
Int. Cl. B01j 11/40
U.S. Cl. 252—455 Z       17 Claims

ABSTRACT OF THE DISCLOSURE

This invention relates to treatment of formed colloidal size zeolites to facilitate subsequent processing by removing soluble salts from aqueous suspension of said colloidal zeolite in the mother liquor remaining after crystallization, without appreciably changing the zeolite concentration in the suspension. Such treatment involves contacting said zeolite suspension with cation and anion exchange resin particles larger than about 10 microns in diameter.

CROSS-REFERENCE TO RELATED APPLICATIONS

This application is a continuation-in-part of application Ser. No. 842,014, filed July 15, 1969, now abandoned.

BACKGROUND OF THE INVENTION

Field of the invention

This invention relates to a method for utilizing colloidal zeolites and especially to a method for handling same and converting them into a form in which subsequent processing is facilitated by removing soluble salts from an aqueous suspension of said colloidal zeolite in the mother liquor remaining after crystallization. This invention further relates to the preparation of catalytically-active substance of colloidal zeolite containing hydrogenation-dehydrogenation components in intimate combination with such components.

Discussion of the prior art

Numerous natural and synthetic zeolites, especially crystalline aluminosilicate zeolites, have been used for various organic compound conversion reactions. These natural or synthetic zeolites generally exist in a particle size range above one micron. In certain hydrocarbon conversion reactions, especially cracking and hydrocracking, it has become desirable to pass the hydrocarbon through the catalyst bed at a greater rate and thus take full advantage of the superactivity inherent in the zeolite catalysts. However, the zeolite catalysts which have high activity become diffusion limited in that they are unable to accept within the zeolite pores the hydrocarbon being fed or passed through the catalyst bed at a rapid enough rate to take full advantage of the intrinsic activity. Thus, it has become desirable to provide zeolites having particle sizes in the colloidal range in order to overcome the unfavorable diffusion effects heretofore experienced. Additionally, colloidal zeolites have become desirable as an approach to cracking large hydrocarbon molecules of the polynuclear aromatic type and other large molecules such as large chain aliphatic molecules of which dodecane and hydrocarbons of longer chain length are typical examples. The use of colloidal zeolites offers an approach to cracking certain hydrocarbon streams which contain metalloorganic compounds which normally tend to coat the external surfaces of the zeolite catalyst and thereby reduce the lifetime of the catalyst necessitating frequent regenerations.

Because colloidal sized zeolites are now being prepared in a size between about 0.005 micron and .3 micron, certain problems have developed during the handling of such zeolites. Specifically, such zeolites offer some handling problems in their ion exchange to a more catalytically-active form useful in cracking and hydrocracking. Additionally, such zeolites present certain handling problems when incorporated with an inorganic oxide matrix material for use as a composite catalyst.

It is an object of this invention to provide a novel method for handling colloidal zeolites so that they can readily be rendered catalytically active subsequent to such handling and can be utilized in catalytically-active forms such as in a dispersion in the reaction mixture, in an agglomerated form, and in forms wherein they are composited with inorganic oxide matrix materials. By the term "agglomerate" what is meant is clumps of colloidal size particles held together by forces which do not prevent the material from being re-dispersed.

It is another object of the present invention to provide colloidal size zeolites containing a hydrogenation-dehydrogenation component which is either deposited on the surface of the crystalline zeolite or introduced in colloidal form in physical admixture with the zeolite.

SUMMARY OF THE INVENTION

This invention contemplates a method of treating a colloidal zeolite to facilitate subsequent processing which comprises removing soluble salts from an aqueous suspension of said colloidal zeolite such that the zeolite particles substantially retain their individual particle dimensions.

Specifically, the present invention contemplates treatment of the colloidal zeolites so that they can subsequently be readily handled for purposes of ion exchange, dispersion of a catalytically-active form of the colloidal sized zeolite in a hydrocarbon conversion reactor, using agglomerates of the colloidal crystallites, or compositing with inorganic oxide binder materials. To accomplish such treatment soluble salts in the aqueous suspension of the colloidal zeolite in the mother liquor remaining after crystallization of said colloidal zeolite must be removed. Preferably, said salts are removed without appreciably changing the zeolite concentration in the suspension as occurs in separation methods such as filtration. Also, the zeolite particles must substantially retain their individual particle dimensions. A method for effectively accomplishing such treatment and the subject of this invention is to utilize anion or cation exchange with resin particles which are large enough for easy separation, such as, for example, larger than about 10 microns in diameter. The soluble salts, including undesirable siliceous components, are removed from the suspension of the colloidal zeolite in the mother liquor by the action of the anion or cation resin particles. For example, an ammonium ion resin can be employed to remove alkali metal cations in the crystallization mother liquor. Suitably, other cationic exchange resins can be used in such treatment. Preferably, cationic exchange resins containing hydrogen ions and anionic exchange resins containing hydroxyl ions may be used in the method of this invention to suitably reduce the soluble salt content of the zeolite suspension system. Anionic exchange resins can be used to remove soluble silica.

The contacting of the suspension system with the exchange resins can be alternately with cationic and anionic organic ion exchange resin or with a mixture of the two types of exchange resins simultaneously.

Colloidal amorphous silica and/or metal oxides can be separated from the zeolite suspension system by treatment with a strongly basic anion exchange resin between 9 and 12 pH and preferably between 10 and 12 pH, but below the pH of the reaction mixture from which the zeolite was crystallized. One typical example of a resin suitable for this purpose is marketed by Rohm and Haas Company under the trademark Amberlite IRA 938. This resin can be used to remove silica and metal oxides from the mother liquor. The dispersion can then be heated to evaporate part of the water thereby concentrating the colloidal zeolite particles into a form in which they can be further ion exchanged, washed, dried and/or calcined.

The products obtained by the method of this invention can be spray dried to form weak agglomerates which are used in such forms or redispersed in aqueous or organic media. Other drying methods can similarly be used. Redispersion is performed so that hydrocarbon conversion over the redispersed catalytically-active zeolites can take full advantage of the substantially unlimited diffusion properties of the zeolites together with the other aforementioned advantages in catalysis.

The colloidal sized catalyst can be dispersed in an aqueous medium with the aid of dispersing agents. These agents are used in concentrations of 0.05 to 5 weight percent of the solids to be dispersed. Such dispersing agents include: tannic acid, lecithin, ethylene oxide-alkyl phenol polymers, salts of lignosulfonic acid, soluble salts of polymerized substituted benzoid alkyl sulfonic acids, alkali metal of saturated fatty acids having from 12 to 20 carbon atoms such as sodium stearate, soluble salts of carboxymethylcellulose and various phosphates. If the colloidal catalyst is to be suspended in an organic medium, various dispersing agents can again be used to advantage in concentrations of about 0.1 to 15 percent by weight of the solids. Examples of dispersants suitable for use in organic media include soaps, detergents and organic esters.

Another method for employing zeolites prepared in accordance with the invention and which have been ion exchanged in a concentrated mass is to form them into an oil-in-water or water-in-oil emulsion. The emulsion can then be added directly to the reactants or directly to a catalytic system for use in organic compound conversion catalysis. The formation of the emulsion is facilitated by the use of emulsifying agents in concentrations of about 0.1 to 15 weight percent of the total liquid. Such agents include: soaps, detergents, sulfonates, organic esters, polyethylene glycol esters of aliphatic carboxylic acids, soluble salts of carboxymethylcellulose, starch, tannins, lignosulfonates and alkyl polyoxyethylene amines.

Another method for employing colloidal zeolites prepared by this invention is to form an emulsion of an aqueous dispersion of the colloidal crystalline zeolites as discussed above with an organic medium which has a higher boiling point than water. The emulsion is then heated to vaporize water thereby suspending the colloidal zeolites in the organic medium with the aid of a surfactant, if desired. The organic medium can then be transferred to an organic compound reaction vessel for the purposes of employing the colloidal zeolite as a catalyst.

As stated above, synthetic zeolites, especially synthetic crystalline aluminosilicates having uniform pore dimensions and a rigid three-dimensional structure, can be prepared in a form having a particle size between about 0.005 micron and 0.3 micron. As used herein, "particle size" means the largest particle dimension regardless of the form of the crystal, e.g. spherical, needle-like. The types of colloidal zeolites which can be prepared are broad and include the following synthetic zeolites: synthetic faujasite of both the X and Y variety, A, synthetic mordenite, zeolite L, T, ZK-4, beta, alpha, synthetic offretite, synthetic erionite, zeolite ZSM-4 and ZSM-5 and other synthetic crystalline zeolites having uniform pore dimensions.

It is particularly preferred that the zeolite have a silica-alumina mole ratio of at least 3 although zeolites having a silica-alumina mole ratio of about 2–3 can be effectively prepared. Synthetic crystalline zeolites having a silica-alumina mole ratio in excess of 3 are particularly preferred as these can be converted to catalytically-active forms which possess particularly good properties with respect to cracking and hydrocracking catalysis. Some of these crystalline zeolites are particularly useful in other hydrocarbon conversion processes, notably isomerization, disproportionation, alkylation, dealkylation, polymerization, oxidation, reduction and various forms of transalkylation.

There are various methods by which colloidal zeolites can be synthesized prior to treatment according to this invention. Essentially, colloidal zeolites are prepared by preparing a crystalline reaction mixture comprising the oxides of substituents forming the resultant zeolites. The reaction mixture is maintained for a specified period of time under conditions which favor nucleation of zeolite particles over growth of individual zeolite particles. Specifically, colloidal zeolites are prepared by maintaining the crystallization and synthesis parameters such that a multitude of individual, artificial seeds or sites are created in the reaction mixture whereby any individual zeolite particles in the colloidal size range are formed independently of one another and without substantial tendency of the particles of coalesce resulting in undesirable intergrowth. These conditions whereby nucleation in the reaction mixture is favored over growth of particular crystallites can be accomplished by various methods. One method includes the utilization of ultrasonic energy which may create artificial seeds or electrical-type sites in the reaction mixture. Each site in turn becomes the site for the synthesis of the zeolite from the inorganic oxides in the reaction mixture. By the process of cavitation, many of these sites are created at conditions unfavorable for crystal growth so that the dominant crystallization is nucleation. The result is that for the same degree of crystallization, many more crystals or particles of much smaller size are formed. Even when the synthesis conditions are more favorable for crystal growth, the rate of nucleation is also greater and the additional nucleation sites provided as a result of cavitation result again in favoring nucleation over growth as the dominant crystallization process. Since the number of particles is several hundred times the number normally prepared from the crystallization reaction mixture, the size of the particles is thereby diminished to a size within the aforementioned range herein designated the colloidal range, i.e. between 0.005 micron and .3 micron.

There are other methods by which nucleation can be favored in a reaction mixture which normally tends to prepare zeolites having a particle diameter substantially greater than .2 micron. Thus, by preparing a crystallization reaction mixture which is exceptionally supersaturated with respect to the oxides reacting to form zeolite, a high rate of nucleation is favored at the expense of growth of individual crystals. Thus, the resultant particles are all within, or generally within, the colloidal particle size range. The degree of supersaturation of the reaction mixture depends, of course, upon the specific zeolite being prepared. However, it has been observed that it is easier to prepare high silica/alumina mole ratio zeolites by the method employing high degrees of supersaturation than it is for preparing compositions wherein the silica/alumina mole ratio in the final product is within the range of about 2–5. The reason for this is not fully understood, but it is believed that the properties of the silica in the reaction mixture determine to a large extent the rate of nucleation as against the growth of individual crystals.

Still another method of preparing colloidal zeolites involves the use of impurities which preclude or limit the growth of crystallites within the reaction mixture and thus permit nucleation to prevail over growth.

The composition of the reaction mixture for the preparation of a given zeolite will be substantially that presently known for its synthesis. The reaction mixture is subsequently modified depending upon the method chosen to favor nucleation over growth. Thus, if supersaturation is utilized as the method for precipitating the zeolite in the colloidal particle size range, the resultant amount of solvent, e.g. water, will fall outside of the range heretofore suggested for synthesis of the given zeolite. On the other hand, if the method by which growth is inhibited is chosed for preparation of the colloidal sized zeolite, the reaction mixture will include, during the synthesis, a growth inhibitor.

Crystallized colloidal zeolites treated according to the present invention can be employed in the as synthesized form or can be converted into other forms through ion exchange. It is desirable to minimize ion exchange under conditions which avoid elimination of the advantages attributable to colloidal size particles. Thus, it is desirable to avoid ion exchange of the colloidal zeolites under conditions which tend to cause crystal growth and loss of the effective colloidal size. Aside from this condition and others which appear to those skilled in the art, the colloidal zeolites can be ion exchanged with substantially all of those salts or acids which can be used for ion exchange of the same zeolite having a particle size greater than one micron. The high silica containing zeolites are more resistant to acid solutions during ion exchange and can be so exchanged with lower impairment of crystallinity. Generally speaking, the colloidal zeolites can be ion exchanged to remove at least a portion of the alkali metal cations and converted into forms which tend to be more catalytically active and stable. The alkali metal cations, especially the sodium and potassium cations, can be exchanged for hydrogen ions by treating the zeolite with acids. Alternatively, it can be treated with a source of ammonium, alkylammonium, or arylammonium, providing steric hinderances do not prevent the cation from entering the cages of the zeolite. If the alkali metal is replaced for an ammonium cation or complex, the hydrogen form is prepared therefrom by heating the exchanged composition until ammonia is evolved causing retention of a proton in the composition at the site previously occupied by the ammonium ion.

Other replacing cations include cations of Groups I-B—VIII of the Periodic Table, especially metals of Groups II and III, including the rare earth metals, tin, lead, metals of the actinide series, antimony, bismuth, chromium; also Groups VII-B and Group VIII. Regardless of the cations replacing the alkali metal cations in the as synthesized form of the colloidal zeolites, the spatial arrangement of the aluminum, silicon and oxygen atoms, which form the basic crystal lattice of the zeolite, remains essentially unchanged by the described replacement of sodium as determined by X-ray diffraction analysis of the ion exchanged material.

Ion exchange of the colloidal zeolites after treatment according to this invention can be accomplished conventionally by contacting the zeolite with a solution, suitably an aqueous solution, of a salt of the exchanging cation. Additionally, the composition can undergo solid state exchange to remove sodium and substitute another cation therefor. Preferably a solution exchange is employed.

While water will ordinarily be the solvent in the base exchange solution employed, it is contemplated that other solvents although generally less preferred, can be used. These often aid in preventing coalescence by limiting the amount of electrolyte in contact with the colloidal zeolite. Thus, in addition to an aqueous solution, alcohol solutions and the like of the exchange compounds can be employed in producing a catalyst composition. Generally, the residual alkali metal content is reduced to less than 4 percent by weight and preferably less than 3 weight percent. When the exchanged aluminosilicate is prepared, it is generally, thereafter, treated with a suitably solvent, e.g. water, to wash out any of the anions which may have become temporarily entrained or caught in the pores or cavities of the crystalline composition. It should be understood that colloidal zeolites are useful as adsorbents in the alkali metal form and in the sodium form can be used in catalysis, e.g. oxidation of hydrogen sulfide.

The coloidal zeolite catalyst treated according to this invention can be incorporated with other materials, such as active and inactive inorganic materials, which function as a matrix for the new catalyst. These inorganic materials include, among others, naturally-occurring clays and metal oxides. The latter can be either naturally-occurring or in the form of gelatinous precipitates or gels including mixtures of silica and metal oxides. The inactive materials suitably serve, among other things, as diluent to control the amount of conversion in a given process so that the products can be obtained economically and orderly without employing other means for controlling the rate of reaction. A colloidal zeolite can be incorporated into a naturally-occurring clay such as kaolinite, which improves the crush strength of the catalyst and makes it more suitable in commercial operations. These inorganic oxide matrix materials function as binders for the zeolite. Naturally-occurring clays which can be composited with colloidal size zeolites include the montmorillonite and kaolin family, which families include the subbentonites and the kaolins commonly known as Dixie, McNamee-Georgia and Florida clays, or others in which the main mineral constituent is halloysite, kaolin, dickite, nacrite or anauxite. Such clays can be used in the raw state as originally mined or initially subjected to calcination, acid treatment or chemical modification. Binders useful for composition with the catalyst also include inorganic oxides, notably alumina. If the colloidal zeolite is incorporated into a matrix, ion exchange can be performed on the zeolite before or after incorporation in the matrix. In addition to the foregoing materials, the catalyst can be composited with a porous matrix material such as silica-alumina, silica-magnesia, silica-zirconia, silica-thoria, silica-beryllia, silica-titania, as well as ternery compositions such as silica-alumina-thoria and silica-alumina-zirconia. It can be introduced as a component into one or more of the reactant solutions used in making the aforementioned gels. The relative proportions of colloidal zeolite and inorganic oxide matrix vary widely with the crystalline aluminosilicate content ranging from about 1 to about 97 percent by weight.

The use of colloidal zeolites of this invention composited with inorganic oxide matrix materials in many instances provides synergistic effects. Thus, combining a highly-active crystalline aluminosilicate zeolite with a major proportion of a catalytically-active matrix material enhances production of gasoline of higher octane values than produced by cracking with the zeolite alone, while concomitantly providing a composite catalyst which can be used at higher space velocities. The composite catalyst has greatly superior properties with respect to product selectivity and steam stability.

Colloidal zeolites of this invention can contain a hydrogenation-dehydrogenation component, such as an oxide of a metal, a sulfide of a metal, or a metal of Groups II-B, VI and VIII of the Periodic Table, and manganese. Representative elements which can be incorporated in the zeolite are cobalt, nickel, platinum, palladium, ruthenium, rhodium, osmium, iridium, chromium, molybdenum and tungsten. The most preferred metals are platinum, palladium, nickel, zinc and cadmium. These materials either in their elemental form, as oxides, or sulfides, can be impregnated on the zeolite or in cationic form can be exchanged into the zeolite for a sodium or other alkali metal cation.

The methods for impregnation and/or exchange are those commonly used in the art. These hydrogenation-dehydrogenation components can be intimately combined by other means, as by physical admixture. The resultant catalyst, especially in a form containing less than 4 percent by weight alkali metal, preferably less than 3 percent, is useful in hydrocracking and reforming, as well as other processes involving hydrogenation or dehydrogenation.

The catalyst preparation techniques outlined above cover the introduction of catalytic functions by ion exchange. There are many other ways that catalytic functions can be created in combinations with the catalyst preparation techniques already discussed. Hydrogenation-dehydrogenation functions, for example, can be incorporated by impregnation; addition of metals, metal oxides or metal sulfides to the colloidal crystalline aluminosilicate and especially be electroless deposition of metals on the crystalline aluminosilicate such as by the method of U.S. Pat. 3,511,683.

Another method of introducing the catalytic functions of the zeolite prepared according to this invention resides in depositing on a component other than the colloidal crystalline aluminosilicate in the cases where aggregates are used. Thus, a hydrogenation component can be deposited on a matrix material or intimately associated with a colloidal crystalline aluminosilicate. Thus, if a hydrogenation component is deposited on a matrix material which is in intimate association with the colloidal zeolite, the material can be used for a hydrocarbon conversion involving hydrogenation or dehydrogenation such as hydrocracking. Colloidal crystalline aluminosilicates, of course, can be composited with metals, metal oxides, metal sulfides, or metal salts to form aggregates in which case the resultant composition can be useful in the hydrocarbon conversion reactions involving two functions, such as, a cracking function which is provided by the crystalline aluminosilicate and a hydrogenation function which is provided by the material with which the crystalline aluminosilicate and a hydrogenation function which is provided by the material with which the crystalline aluminosilicate is composited.

Catalysts produced by the procedures outlined above involving forming an agglomerated mass of the colloidal crystalline aluminosilicate for further handling and incorporating the same in a matrix can be dispersed directly in reactants or charged to a reactor mixture. If the activity of the colloidal crystalline aluminosilicate is sufficiently high, very low catalyst/reactant ratios can be practical without the need to recycle the catalysts. However, colloidal catalysts can be recycled by separation and return of a catalyst-rich stream from the effluent of the reactor by such means as centrifugation.

Other catalytic functions can be introduced in colloidal form into a reactor containing a colloidal crystalline aluminosilicate. For example, palladium, electrolessly deposited on colloidal alumina, can be added with a colloidal hydrogen zeolite Y or colloidal rare earth exchanged zeolite Y to a hydrocracking process. The mixture of colloidal zeolitic catalyst and the colloidal hydrogenation-dehydrogenation catalyst can be employed as a dispersion in an aqueous or organic medium or in an oil-in-water or water-in-oil emulsion. The mixture can also be spray dried into agglomerates and used in such form, or combined with a matrix material.

The following example demonstrates the method of this invention and is not to be considered limiting in any way.

EXAMPLE

Synthesis of colloidal zeolite ZSM-5

A solution containing 162 lbs. of Q-brand sodium silicate (28.7% wt. $SiO_2$, 8.9% wt. $Na_2O$) and 202.5 lbs. of water was continuously mixed with a second solution containing 5.5 lbs. of $Al_2(SO_4)_3 \cdot 18H_2O$, 20 lbs. of tetrapropylammonium bromide (TPABr), 61 lbs. of NaCl, 13.5 lbs. of $H_2SO_4$ (97%) and 277 lbs. of water in a mixing nozzle. The resulting precipitate was discharged from the nozzle into an agitated 150 gallon stainless steel kettle. The kettle was covered and heated up to 205° F. At the end of 156 hrs. of crystallization, the reaction mixture was sampled and removed from the kettle. The product was found to be 95 percent zeolite ZSM-5 by X-ray diffraction. Chemical composition of the product mixture as synthesized had the following formula, expressed as mole ratios, to show its major components other than water.

$4.6(TPA_2O):4.5(Na_2O):86(SiO_2)$:

$Al_2O_3:116(NaCl):21(Na_2SO_4)$ 1000 ml. of the zeolite slurry as synthesized, i.e. colloidal zeolite in the mother liquor (sp. gr. 1.095) was alternately treated with cationic Dowex 50 ($H^+$ form) and anionic Dowex-1 ($OH^-$ form) resin in 100 ml. wet volume batches. The resin beads (20 x 50 mesh) were placed inside a fine mesh stainless steel container and dipped into the slurry mixture at ambient temperature with gentle agitation. After every 30 minutes, the spent resin was replaced with fresh resin. This step was repeated until the slurry contained negligble halide and sulfate ions. Approximately 400 ml. of each type of resin was needed. The chemical composition of the solid purified by this treatment, expressed in mole ratios, was:

$1.4(TPA_2O):1.15(Na_2O):72(SiO_2)$:

$Al_2O_3:Nil(NaCl):Nil(Na_2SO_4)$

The purified product, zeolite ZSM-5, was free of excess silicate and soluble salts due to the resin treatment. The ultimate crystal size as measured by electron microscopy was about 0.04 micron. It could be progressed easily and effectively from this point through further treatments, such as ion exchange, dispersion in a reactor, forming agglomerates or compositing with inorganic oxide binder materials.

What is claimed is:

1. A method of treating a colloidal zeolite to facilitate subsequent processing which comprises removing excess siliceous components and soluble salts from an aqueous suspension of said colloidal zeolite in the mother liquor remaining after crystallization of said zeolite by contact with organic ion exchange resin selected from the group consisting of anionic, cationic and a mixture of anionic and cationic, said resin being in particle form of a size large enough for easy separation from the treated suspension.

2. The method of claim 1 wherein said resin is in particle form of larger than about 10 microns in diameter.

3. The method of claim 1 wherein said resin contains exchangeable hydroxyl anions.

4. The method of claim 1 wherein said resin contains exchangeable ammonium cations.

5. The method of claim 1 wherein said resin contains exchangeable hydrogen cations.

6. The method of claim 1 wherein said resin contains exchangeable strongly basic anions at a pH between 9 and 12.

7. The method of claim 1 wherein said contacting is alternately with cationic and anionic organic ion exchange resin.

8. The method of claim 1 wherein said organic ion exchange resin is a mixture of anionic and cationic.

9. A method of providing an organic colloidal zeolite dispersion for use in hydrocarbon conversion reactions which comprises contacting said zeolite as defined in claim 1, separating said zeolite from aqueous medium and then dispersing said zeolite in an organic medium with the aid of a dispersing agent selected from the group consisting of soaps, detergents and organic esters in concentration of from about 0.1 to 15 percent by weight of solids to be dispersed.

10. A method of providing an emulsion of a colloidal zeolite for use in hydrocarbon conversion reactions which comprises contacting said zeolite as defined in claim 1 and then forming an emulsion of the aqueous dispersion of said zeolite with an organic medium with the aid of an emulsifying agent selected from the group consisting of soaps, detergents, sulfonates, organic esters, polyethylene glycol esters of aliphatic carboxylic acids, soluble salts of carboxymethylcellulose, starch, tannins, lignosulfonates and alkyl polyoxyethylene amines in concentration of from about 0.1 to 15 percent by weight of the total liquid.

11. A method of providing a catalytically active collodial zeolite for use in hydrocarbon conversion reactions which comprises contacting said zeolite as defined in claim 1 and then ion exchanging said zeolite.

12. The method of claim 11 wherein said ion exchanging step comprises contacting said zeolite with a solution of a salt of an exchanging cation.

13. The method of claim 12 wherein said salt solution is an ammonium salt solution.

14. The method of claim 11 with the further steps of separating said exchanged zeolite from aqueous medium and forming a composite of said zeolite with a matrix material, the concentration of the total composite being from 1 to 97 percent by weight matrix material.

15. The method of claim 14 wherein said composite forming step precedes said ion exchanging step.

16. A method of providing a catalytically-active colloidal zeolite for use in hydrocarbon conversion reactions which comprises contacting said zeolite as defined in claim 1, separating said zeolite from aqueous medium and then impregnating on said zeolite a hydrogenation-dehydrogenation component.

17. The method of claim 1 wherein said zeolite is zeolite ZSM–5.

References Cited
UNITED STATES PATENTS

| | | | |
|---|---|---|---|
| 3,542,509 | 11/1970 | Furtig et al. | 423—328 |
| 3,690,827 | 9/1972 | Garrett | 423—112 |
| 3,313,594 | 4/1967 | Wilson, Jr. | 252—455 Z |

CARL F. DEES, Primary Examiner

U.S. Cl. X.R.

423—112

PO-1050
(5/69)

UNITED STATES PATENT OFFICE
CERTIFICATE OF CORRECTION

Patent No. 3,781,225      Dated December 25, 1973

Inventor(s) Albert B. Schwartz

It is certified that error appears in the above-identified patent and that said Letters Patent are hereby corrected as shown below:

Column 4, line 15    "of coalesce" should be --to coalesce--.

Signed and sealed this 4th day of June 1974.

(SEAL)
Attest:

EDWARD M. FLETCHER, JR.            C. MARSHALL DANN
Attesting Officer                 Commissioner of Patents